(12) United States Patent
Shaimukhambetova (10) Patent No.: US 9,187,378 B2
(45) Date of Patent: Nov. 17, 2015

(54) METHOD OF AEROBIC TREATMENT OF POULTRY MANURE AND APPARATUS FOR PRODUCING ORGANIC FERTILIZER

(71) Applicant: 1867239 ONTARIO CORP., Maple (CA)

(72) Inventor: Damira Shaimukhambetova, Toronto (CA)

(73) Assignee: 1867239 ONTARIO CORP. (CA)

( * ) Notice: Subject to any disclaimer, the term of this patent is extended or adjusted under 35 U.S.C. 154(b) by 0 days.

(21) Appl. No.: 14/138,259

(22) Filed: Dec. 23, 2013

(65) Prior Publication Data
US 2014/0196512 A1    Jul. 17, 2014

Related U.S. Application Data

(60) Provisional application No. 61/752,021, filed on Jan. 14, 2013.

(51) Int. Cl.
| | |
|---|---|
| C05F 3/06 | (2006.01) |
| C05B 17/00 | (2006.01) |
| C05F 17/02 | (2006.01) |
| C05F 3/00 | (2006.01) |
| C05F 17/00 | (2006.01) |

(52) U.S. Cl.
CPC . *C05B 17/00* (2013.01); *C05F 3/00* (2013.01); *C05F 3/06* (2013.01); *C05F 17/0072* (2013.01); *C05F 17/027* (2013.01); *C05F 17/0211* (2013.01); *C05F 17/0258* (2013.01); *C05F 17/0264* (2013.01); *C05F 17/0282* (2013.01); *Y02W 30/43* (2015.05)

(58) Field of Classification Search
CPC ............ C05F 17/0205; C05F 17/0211; C05F 17/0282; C05F 17/0264; C05F 17/0072; C05F 17/027
USPC .................................................... 435/290.1
See application file for complete search history.

(56) References Cited

U.S. PATENT DOCUMENTS

| | | | |
|---|---|---|---|
| 4,135,908 A | 1/1979 | Widmer | |
| 4,139,640 A | 2/1979 | Kipp, Jr. | |
| 4,193,786 A | 3/1980 | Brill | |
| 4,249,929 A * | 2/1981 | Kneer | ................................. 71/9 |

(Continued)

FOREIGN PATENT DOCUMENTS

HU          200300660 A1 *  4/2008

*Primary Examiner* — William H Beisner
(74) *Attorney, Agent, or Firm* — Riches, McKenzie & Herbert, LLP (57) ABSTRACT

A bio-chamber and a method of making organic fertilizer from poultry manure. The bio-chamber has a chamber body that defines a receiving chamber and an aeration chamber. The aeration chamber underlies the receiving chamber and is divided therefrom by a partition. The partition has a plurality of holes formed therein. An oxygen probe and a temperature probe are positioned inside the receiving chamber. An air blower is connected to the aeration chamber and is operable to blow air therein. The method comprises: mixing the poultry manure with a carbon carrier; loading the mixture into the receiving chamber; monitoring the temperature and the oxygen concentration of the mixture; aerating the mixture; and regulating the temperature and the oxygen concentration by adjusting the operation of the air blower. The temperature and oxygen concentration are regulated to provide conditions that permit aerobic bacteria to propagate and biodegrade the mixture.

19 Claims, 5 Drawing Sheets

(56) References Cited

U.S. PATENT DOCUMENTS

| | | |
|---|---|---|
| 4,411,682 A | 10/1983 | Brill |
| 4,414,335 A * | 11/1983 | Kipp, Jr. .................... 435/290.4 |
| 4,795,711 A | 1/1989 | Nockemann |
| 4,956,002 A * | 9/1990 | Egarian ............................... 71/9 |
| 5,116,760 A | 5/1992 | Tanaka et al. |
| 5,312,754 A * | 5/1994 | Bryan-Brown ............ 435/286.6 |
| 5,354,349 A | 10/1994 | Inoue |
| 5,451,523 A | 9/1995 | Von Fahnestock et al. |
| 5,597,732 A * | 1/1997 | Bryan-Brown ............ 435/290.4 |
| 5,730,772 A | 3/1998 | Staples |
| 5,810,903 A | 9/1998 | Branconnier et al. |
| 6,200,475 B1 | 3/2001 | Chen |
| 6,248,148 B1 | 6/2001 | Faulmann et al. |
| 6,281,001 B1 * | 8/2001 | McNelly ....................... 435/262 |
| 6,342,085 B1 | 1/2002 | Giroux et al. |
| 6,627,434 B1 * | 9/2003 | McNelly .................... 435/290.1 |
| 6,800,109 B1 | 10/2004 | Carlen et al. |
| 6,908,554 B2 | 6/2005 | Jackson |
| 7,617,617 B2 | 11/2009 | Gorbell et al. |
| 2010/0186468 A1 * | 7/2010 | Kallassy et al. .................... 71/9 |

* cited by examiner

METHOD OF AEROBIC TREATMENT OF POULTRY MANURE AND APPARATUS FOR PRODUCING ORGANIC FERTILIZER

RELATED APPLICATIONS

This application claims the benefit under 35 U.S.C. 119(e) of U.S. Provisional Patent Application Ser. No. 61/752,021, filed Jan. 14, 2013, which is hereby incorporated by reference.

FIELD OF THE INVENTION

The present invention relates to the field of processing and treatment of poultry wastes, especially chicken manure/excrements and to the field of making organic fertilizers. The invention can be used for the industrial production of organic fertilizer from chicken manure, which can be applied to restore depleted and eroded soils and increase agricultural crop yields grown on them.

BACKGROUND OF THE INVENTION

Poultry production operations generate significant quantities of animal waste, mainly manure. Vegetation chemically burns from direct contact with excrements containing ammonia. Poultry manure can contaminate the surface or groundwater resources through leaching and runoff of contaminants. Runoff from factory farms can go into nearby rivers, lakes and results in fish-kills, dead-zones, closed beaches, and long-term damage to fisheries/ecosystems. In many areas manure causes dangerous contamination of the drinking water due to nitrates. Poultry manure also contains bacteria and pathogens which may also potentially affect soil, water, and food resources. Lack of appropriate treating methods and the bad odor of chicken excrements has created a social problem. Due to increased pressures from society to reduce the impact on the environment, several methods of manure management were developed. Most of them are not efficient, not scalable and not economical.

Composting requires several months, a significant amount of land or other space, and a lot labor for managing compost piles such as mixing, turning etc. which leads to high labor costs. Loss of ammonia occurs during the composting. Some nutrients may be leached due to exposure to rainfall. Furthermore, compost can attract insects, and disease-producing organisms may not be adequately controlled. Another problem with composting is odor nuisances.

Treating chicken manure with high temperatures requires significant power consumption and results in loss of organic matter. Furthermore, because dried chicken excrements have not gone through the biological decomposition stage, they cannot contribute to humus. It is known that humus is the organic matter that has broken down into a stable substance that resists further decomposition.

Other methods require either additional components such as different acids, ferments, enzymes, bio-catalysts, accelerating agents, worms etc. or sophisticated and expensive equipment, which must be specially designed and constructed. Often additional actions such as elevated pressure, mechanical compression, extra heating, agitation, exposure to radiation (including but not limited to super high frequency) etc. of raw materials is required.

In many methods aeration is uneven. Some parts of the mass are excessively aerated and some parts are not aerated enough. Both conditions cannot provide the optimum development of aerobic bacteria. Also some known methods use plastic pipes or metal tubes with holes for aeration. The maintenance for such a construction is not easy. If the holes are clogged by the mass then it becomes difficult to clean them.

The population of the world is consuming more and more food. But despite the increasing use of chemical fertilizers, agricultural crop yield is gradually and constantly decreasing. It has been found that the exclusive and prolonged use of chemical fertilizer is harmful to the soil's ability to restore its fertility due to depleted humus. For good soil conditions the organic matter should be retained. Organic fertilizers contribute to the fertility of the soil by adding organic matter and nutrients. Chemical fertilizer does not have this organic matter.

SUMMARY OF THE INVENTION

Chicken excrements consist of raw organic matter in a large fraction, which in combination with other nutrients is a major component of the fertility of a vegetative layer of soil. If it is properly treated and decomposed it becomes good fertilizer. The present invention is a simplified method of aerobic treatment of poultry manure mixed with a carbon carrier such as sawdust under controlled conditions. It is well known that for rapid development and vital activity of aerobic bacteria, and hence for rapid aerobic decomposition of the mass, oxygen supply is needed. This invention is about how to provide adequate oxygen supply (i.e. a method of proper, even aeration) for optimum development and propagation of aerobic bacteria. This is achieved by monitoring temperature and oxygen concentration, which provide a good indication of proper aeration and development of the decomposition process. A short decomposition time, such as only 3-5 days, can be achieved by this method.

The invention also provides an inexpensive and simple apparatus for making the fertilizer. The main element in the production line is a specially designed bio-chamber where the biodegradation occurs. The constructive design of the bio-chamber allows for even and uniform distribution of the air and very simple maintenance of the bio-chamber itself. Furthermore, the bio-chamber does not require any actions such as turning over, spinning or agitating, which significantly simplifies the production process and reduces costs. Preferably an open top twenty or forty foot sea container or shipping container can be repurposed for use as the main component of the bio-chamber. These are inexpensive and easy to obtain. Their dimensions can slightly vary, but are approximately height 2.3 m, width 2.3 m and length 6 m or 12 m.

Properly mixed raw materials are placed into a bio-chamber equipped with temperature and oxygen probes. Airflow is supplied by a high pressure air blower. Uniform distribution of the air is provided by a specially designed double bottom of the bio-chamber and by the pressurized (forced) airflow. Air penetrates all layers, and there is no need to agitate or turn the mass. There is no need to treat the mass with mechanical compression, friction, exposure to rays or radiation (including but not limited to super high frequency radiation). Also there is no need to pre-heat the air. Intermittent (pulse) air supply reduces power consumption. There is furthermore no need to add additional substances such as acids, ferments, enzymes, bio-catalysts, accelerating agents, worms, etc. Furthermore, the process requires significantly less time and space than composting.

The optimal temperature of the process is 75°-85° C., which ensures that all pathogens and *salmonella* are killed, and all weed seeds are eliminated. The best oxygen concentration is 5%-13%.

Using this method, high quality organic fertilizer can be produced within only 3-5 days in an inexpensive production line that can be easily built with existing machinery. As there is no need for specially developed or sophisticated equipment, and no additives are required, the invention provides a cheaper production process. Only the bio-chamber where the process of biological decomposition of organic matter will occur needs to be constructed. This does not require a lot of work or materials. Furthermore, the production process is environmentally friendly and waste-free, and the production line is scalable and flexible.

Accordingly, in one aspect the present invention resides in a bio-chamber for producing organic fertilizer, the bio-chamber comprising: a chamber body defining a receiving chamber and an aeration chamber, the aeration chamber underlying the receiving chamber and being divided therefrom by a flat partition, the partition having a plurality of holes formed therein; at least one oxygen probe positioned inside the receiving chamber; at least one temperature probe positioned inside the receiving chamber; and at least one air blower connected to the aeration chamber and operable to blow air therein.

Preferably, the bio-chamber further comprises a plurality of said oxygen probes, at least one of said oxygen probes being positioned in each of a lower region, a middle region, and an upper region of said receiving chamber; and a plurality of said temperature probes, at least one of said temperature probes being positioned in each of the lower region, the middle region, and the upper region of said receiving chamber.

In a preferred embodiment, said plurality of holes are arranged in a grid pattern, the grid pattern defining a plurality of square cells, with one said hole being positioned at each node of the grid pattern, and one said hole being positioned at a center of each of said cells.

Preferably, the cells are approximately 10 cm by 10 cm, and the holes have a width of 4 mm to 5 mm.

Optionally, the bio-chamber further comprises an exhaust fan connected to the receiving chamber.

In a preferred embodiment, the bio-chamber further comprises a cover for the receiving chamber that is at least partially removable.

In an especially preferred embodiment, the chamber body comprises a sea container or a shipping container. The sea container or shipping container can have walls that are at least partially covered with stainless steel sheets; and the partition can comprise at least one stainless steel sheet.

Preferably, the at least one air blower has a motor power of at least 0.75 kW, a pressure of at least 4200 Pa, and a volumetric flow rate of at least 9.5 cubic metres per minute for each 2.2 m³ of a mass contained in the receiving chamber, the mass having a height of 1.5 m.

In another aspect, the present invention resides in a method of making organic fertilizer from poultry manure mixed with a carbon carrier, the method comprising: mixing the poultry manure with the carbon carrier; loading the poultry manure and the carbon carrier into the receiving chamber of the bio-chamber; monitoring a temperature of the mixture and an oxygen concentration of the mixture; evenly and fully aerating all layers of the mixture with the at least one air blower; and regulating the temperature of the mixture and the oxygen concentration of the mixture by adjusting the operation of the at least one air blower, to provide conditions that permit aerobic bacteria to propagate and biodegrade the mixture.

The poultry manure should be crushed to a particle size of 5 mm to 10 mm before the poultry manure is mixed with the carbon carrier.

Preferably, the carbon carrier is sawdust.

In preferred embodiments, a pH value of the mixture is from 6 to 8, a C:N ratio of the mixture is from 23:1 to 26:1, a moisture content of the mixture is from 49% to 54%, the oxygen concentration of the mixture is maintained above 5%, and the temperature of the mixture is maintained below 90° C.

In especially preferred embodiments, the temperature of the mixture is permitted to rise to 75° C., and is then maintained at 75° C. to 85° C. until the biodegradation is complete, and the oxygen concentration of the mixture is permitted to fall to 6%, and is then maintained at 5% to 13% until the biodegradation is complete.

The organic fertilizer produced by this method can have more than 50% organic material, a nitrogen:phosphorus:potassium ratio from 2-2.5-2.5 up to 2.7-3.0-3.0, and be free of pathogens, *salmonella*, and weed seeds.

In a further aspect, the present invention resides in a production line for producing organic fertilizer using the aforementioned method, the production line comprising a manure crusher, a mixer having a weighing scale, the aforementioned bio-chamber, a packing and packaging machine, and several belt conveyors.

Optionally, the production line further comprises a dryer and a machine for making granules.

In preferred embodiments, the production line is automated and mobile.

BRIEF DESCRIPTION OF THE DRAWINGS

Reference may now be made to the following detailed description taken together with the accompanying drawings in which.

DETAILED DESCRIPTION OF THE PREFERRED EMBODIMENTS

Figure 1:
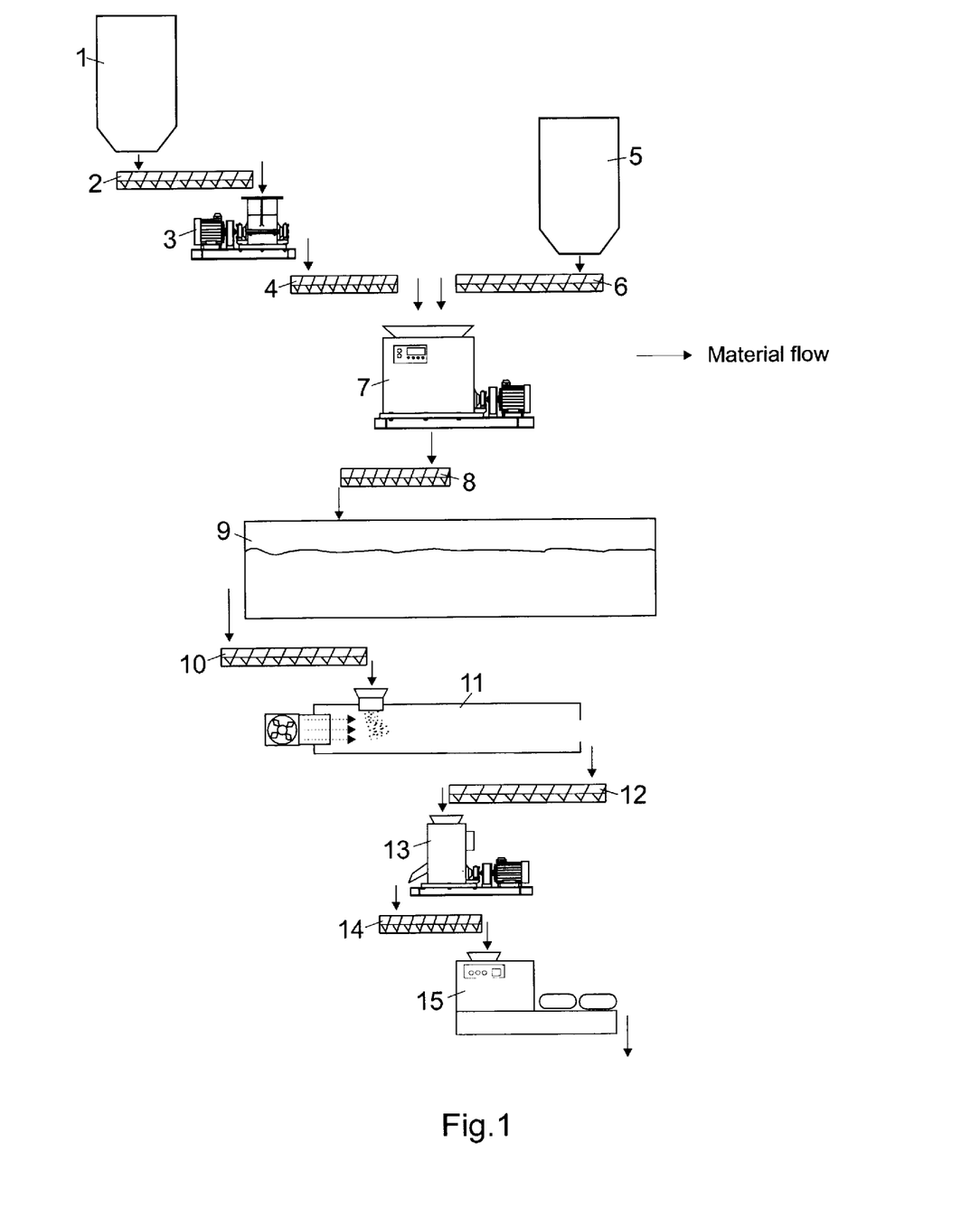
FIG. 1 shows a complete production line.

Reference may first be had to FIG. 1, which depicts a complete production line according to a preferred embodiment of the invention. At the beginning of the process the raw materials, chicken manure (excrements) and sawdust, are inside hoppers (1) and (5), respectively. Although sawdust is preferably used as the carbon carrier, other suitable sources of organic carbon such as peat, crushed wood chips, hay or straw could be used instead. The raw materials should be properly mixed to give a homogenized structure, as this will shorten the decomposition time. The best particle size is 5 mm-10 mm. Usually the sawdust particles are already this size and do not need to be crushed. For the sawdust it is preferable to mix deciduous and coniferous sawdust to give a pH value within the range 6-8.

The chicken manure should be crushed because more homogenized pieces will speed up the decomposition process. The chicken manure is delivered by belt conveyor (2) into the manure crusher (3). After crushing, the manure is delivered by belt conveyor (4) to the mixer (7), which is equipped with a weighing scale. Sawdust is delivered by belt conveyor (6) to the mixer (7) as well. Both components are delivered to the mixer (7) in proper proportions. Proportions are identified by the ratio C:N for the mixture. The best value for this ratio is between 23:1 and 26:1. It is easy to identify the proper proportions of each component using the ratio C:N for each component. The ratio C:N of each component should be analyzed by a laboratory.

Proper blending of carbon and nitrogen is important so that the bacteria are supplied with the required nutrients and sources of energy to be able to work effectively, and to ensure the temperature of the process is high enough. Calculation of the moisture content of the mixture can be done using the moisture content of each component and their proportions in the raw mass. If needed, water can be added to provide optimum moisture content values of 49%-54%.

Properly mixed raw materials are placed by the belt conveyor (8) into the bio-chamber (9) in loosened form. Preferably, the mixture has a height of 120 cm-150 cm in the bio-chamber (9). If the height is too high, the mixture of materials will be compressed by its own weight, thus reducing air space between particles that is needed for rapid aerobic decomposition. Also, if the height of the mixture is too high, the airflow may not reach the top layer of the mass due to insufficient pressure of the air blower (20).

Figure 2:
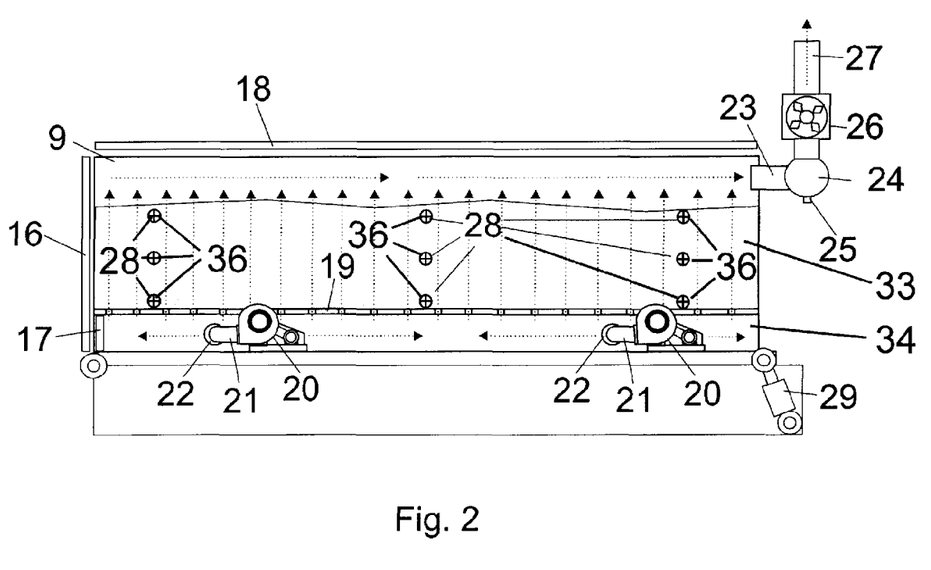
FIG. 2 is an enlarged and detailed side view of the bio-chamber (9) from the production line of FIG. 1.
Figure 3:
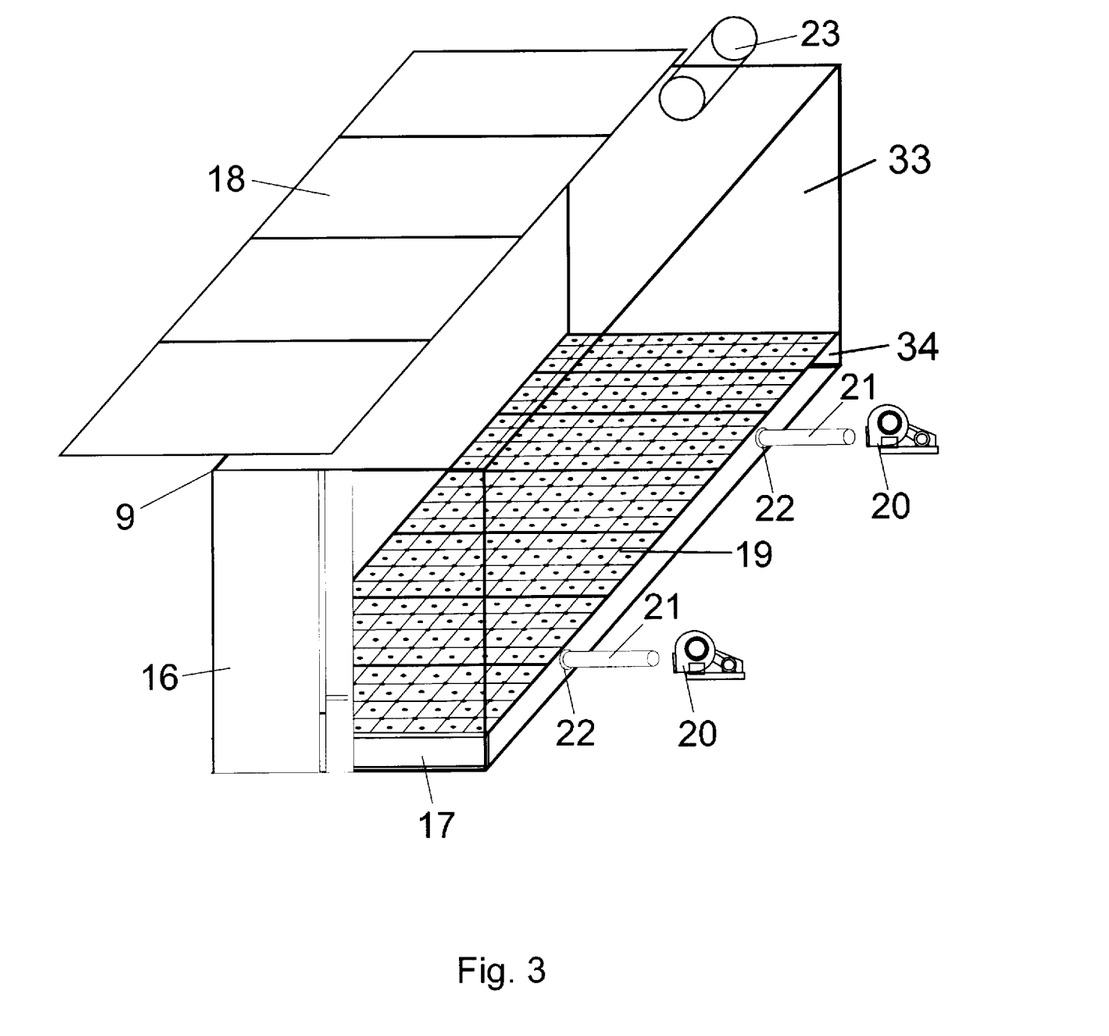
FIG. 3 is a detailed perspective view of the bio-chamber (9) from the production line of FIG. 1.

The bio-chamber (9) is shown in detail in FIG. 2 and FIG. 3. The bio-chamber (9) should be made of material that is resistant to aggressive and corrosive substances such as chicken manure. Stainless steel is preferred. Other materials can optionally be used such as different types of plastic, glass, wood, etc. It is most preferable to use either a twenty or forty foot used sea container or shipping container. If a regular shipping container is used, rather than an open topped sea container, hatches can be installed at the top of the container for loading the mixture. The walls and a door (16) of the container should be covered with stainless steel sheets up to a height of 160 cm.

The bio-chamber (9) has a double bottomed structure, with a flat partition (19) that divides the bio-chamber (9) into a receiving chamber (33) and an aeration chamber (34) as shown in FIG. 2 and FIG. 3. The partition (19) consists of stainless steel sheets (30) with drilled holes (32) of diameter 4 mm-5 mm. Alternatively, instead of holes (32), slits (31) of 4 mm-5 mm width can be drilled in the partition (19). These holes (32) (or slits (31)) are less likely to become clogged because the size of the holes (32) is less than the size of most of the particles of the mixture.

Figure 4:
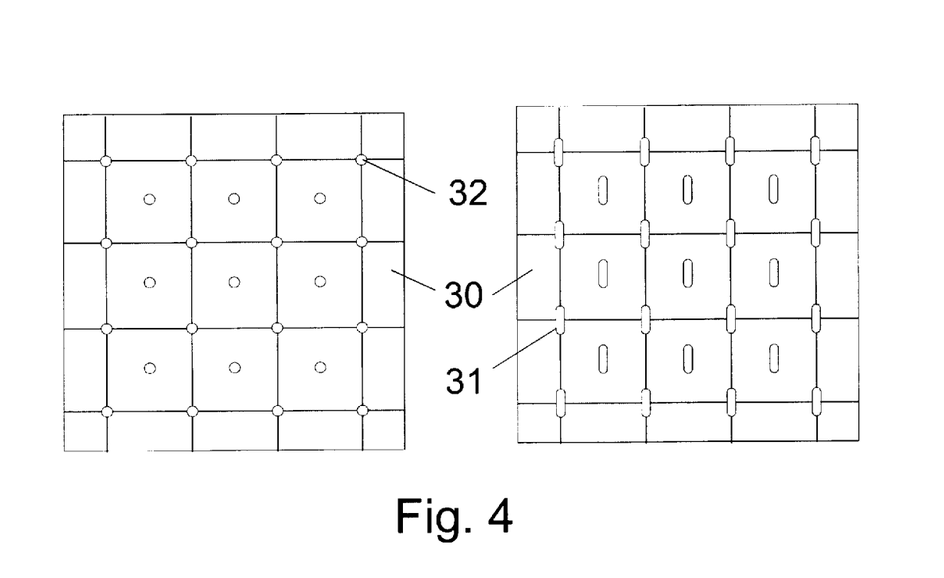
FIG. 4 is a detailed view of stainless steel sheets from which the flat partition (19) of the bio-chamber (9) of FIG. 2 and FIG. 3 are made.
Figure 5:
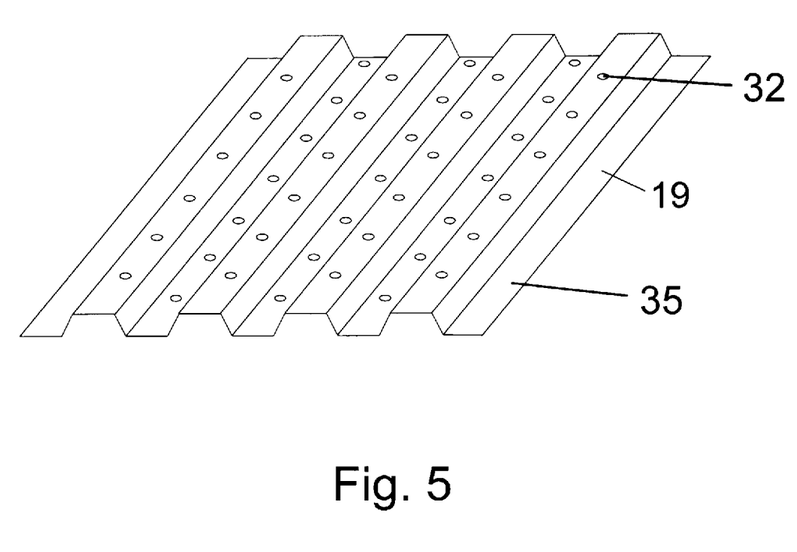
FIG. 5 is an alternate embodiment of the partition (19) formed from profiled sheeting.

These stainless steel sheets (30) should be screwed on channel bars welded to the bottom of the bio-chamber (9). Holes (32) in the partition (19) are preferably positioned on nodes of a 10 cm grid, and in the center of each square of the grid, as shown in FIG. 3 and FIG. 4. The distance between the nodes can differ depending on the air flow generated by the high pressure air blowers (20). Different size grids and different size and/or shape of holes (32) can be used if they ensure even and sufficient aeration. Furthermore, instead of stainless steel sheets (30), profiled sheeting (35) can be used as the partition (19) as shown in FIG. 5. The profiled sheeting (35) has the same configuration of holes (32) or slits (31) drilled in it. The holes (32) provide even aeration and uniform distribution of the air, and the pressure from the air blowers (20) ensures that air penetrates all layers of the mass. This ensures that all of the mass is able to undergo rapid aerobic decomposition.

It is easy to clean the holes (32). All stuck particles can be pushed through the holes (32). During regular maintenance, which preferably occurs once in a year, the flat partition (19) can be unscrewed and the aeration chamber (34) can be cleaned. If needed, the aeration chamber (34) can be cleaned at any time by disconnecting the high pressure air blower (20) from the sleeve (21), which tightly fits into hole (22), and inserting a vacuum cleaner hose into the sleeve (21) to suck out any small particles.

The partition (19) should be placed apart from the bottom of the bio-chamber (9) at a distance greater than the diameter of the sleeve (21). A distance of 20 cm is enough. One or two high pressure air blowers (20) are required for each bio-chamber (9) to blow air into the aeration chamber (34). Forced airflow will go through the holes (32) and penetrate the mass from underneath.

Spent air, excessive moisture, and generated gases can be withdrawn from the bio-chamber (9) with the help of an exhaust fan (26) and chimney stack (27). Excessive moisture and steam condensate goes through the joining part (23) and is collected in elbow part (24), which has a tap (25) to drain the water. The bio-chamber (9) can be covered preferably with a light plastic cover (18), which can be folded, or with any other suitable materials such as metal, tarpaulin or similar. An advantage of this construction is that odor can be significantly reduced.

It has been found that 12 seconds of working time of an air blower (20) with a motor power of 0.75 kW, pressure of 4200 Pa, and volumetric flow rate of 9.5 cubic meters per minute is enough for the blown air to penetrate the top layer of 2.2 $m^3$ (with a height of 1.5 m) of the mass. For a 40 ft container, two air blowers (20) with motor power of 3 kW, pressure of 8600 Pa or greater, and volumetric flow rate of 26 $m^3$/min (or greater) is enough. If a less powerful air blower (20) (or less pressure or less volumetric flow rate) is used, then longer working periods will be needed for air penetration. Operating periods of the blower (20) will depend also on the porosity of the raw mass.

The bio-chamber (9) is equipped with oxygen and temperature probes (36) which are positioned inside the bio-chamber (9) through holes (28) at three levels—lower, middle and upper as shown in FIG. 2. This permits monitoring of three different layers of the decomposing manure, so that the conditions of the entire mass can be assessed. Initially the mixed raw materials contain enough air with an oxygen concentration of about 18% for the decomposition to start. During the first couple of hours the air blower (20) should not turned on while the process starts. The signal for the air blower (20) to be turned on is a drop of the oxygen concentration to 6%-8%. The best oxygen concentration is 5%-13%. Also, the decision to turn on the blower (20) depends on the temperature as well. If the oxygen concentration is in the middle of the range but the temperature is not going up fast enough, then turning on the blower (20) can be postponed until oxygen decreases further. Anaerobic processes must be avoided, and so oxygen levels less than 2%-3% are unacceptable. If the oxygen concentration is in the middle of the range and the temperature is going up too fast, then the blower (20) can be turned on more often to slow down the heating of the mass. The exhaust fan (26) should also be turned on simultaneously with the air blower (20), as this will remove excessive heat (hot air) more quickly. For this reason, it is preferable to use a contruction with an exhaust fan (26) and chimney stack (27), rather than having to open the cover (18) of the bio-chamber (9).

The operating time of the air blower (20) can be exactly identified by measuring oxygen concentration in all three layers. Usually several seconds, such as 8 sec-12 sec, is enough to saturate all layers with sufficient oxygen. The idle time (pause) is 20-30 minutes. The idle time also can be identified by the oxygen concentration. If the oxygen concentration goes below 5%, the air blower (20) should be turned on. The air will penetrate the lower and middle layers first before reaching the upper layer. To provide air to the upper layer, the air blower (20) should work several seconds more than for the lower or middle layers. The exact number of seconds can be identified experimentally using readings from the oxygen and temperature analyzers (36). The process can be easily adjusted for different sized bio-chambers (9) and different types of air blowers (20) by relying on these temperature and oxygen readings.

A short operating time of the air blower (20) is energy and cost saving. Excessive air will cool down the mass and slow the process. Also it may cause a loss of too much carbon dioxide ($CO_2$) and prevent the slight accumulation of $CO_2$ that is needed by the bacteria. If the initial temperature of the mass is less than 20° C. then it will take time for the psychrophylic bacteria, which are active in lower temperatures from below zero up to 20° C., to start the process and generate heat. It was found that the duration of this stage is not very important for the quality of the end product, and if time is critical then air can be heated to shorten the duration of the biodegradation. However, there is no requirement to actively heat the mass, as the biodegradation process will itself generate heat. Once the temperature of the mass reaches 20°-23° C., mesophilic bacteria continue the biodegradation and further increase the temperature inside the decomposing materials. It is best if the mesophilic stage lasts not less than 3 hours and not more than 7 hours. Next, thermophyllic bacteria take up the process. It was found that during this stage the maximum air consumption occurred and the air blower (20) worked more often. Idle time decreased to 3-4 minutes. The temperature should reach 75°-85° C. within 9-15 hours.

The temperature should not be allowed to go higher than 85° C. A temperature higher than 90° C. is not acceptable. If the temperature is too high the quality of the fertilizer will be poor. If the temperature gets close to 85° C., then the air blower (20) and the exhaust fan (26) should be turned on for cooling the mass. During the thermophyllic stage, which lasts several days (3-4), pathogens, eggs of helminthes, *salmonella*, and weed seeds are killed. Inside the decomposing organic matter of the mass the humus is being formed. The difference in temperature in the center of the decomposing organic mass and at the edges is 5° C.-7° C. The design of the bio-chamber (9) allows the temperature to be regulated such that all parts of the mass are exposed to high temperatures. This ensures that all pathogens, eggs of helminthes, *salmonella*, and weed seeds are killed.

When oxygen is no longer being consumed and the temperature is steadily decreasing, this means the process is finished and the end product is ready to be unloaded. It is not necessary to wait until the temperature of the product goes down to the ambient temperature. At the moment when the temperature constantly goes down at a rate of several degrees per hour, the air blower (20) can be turned on to cool down and dry the mass. The product may be unloaded at a temperature of 65°-68° C. or lower. The end product is delivered by the belt conveyor (10) from the bio-chamber (9) to the dryer (11) to be dried if necessary to a moisture content of 20%-25%.

To simplify the process of unloading the fertilizer from the bio-chamber (9), a hydraulic lift (29) can be put underneath of the end of the bio-chamber (9) opposite to the door (16). Another way of lifting the opposite end is to use a winch connected to the frame above. Also a hydraulic lift (29) or winch can be used for cleaning the aeration chamber (34) by lifting the bio-chamber (9) on one side (opposite to the door (16)), opening the small door (17) between the partition (19) and the bottom of the bio-chamber (9), and turning on the high pressure air blower (20). All stuck particles will be eliminated through the door (17).

The unloading can alternatively be done with a similar method of inclination implemented not to the opposite side of the door (16), but to one of the long sides of the bio-chamber (9). In this case hatches are positioned along the other long side of the bio-chamber (9), from which the fertilizer can be unloaded. Another method of unloading is to use an air discharge system (vacuum suction system or pneumatic conveying system).

After that the fertilizer is ready for sale. It is free of harmful substances and can have more than 50% organic matter. This organic matter distinguishes organic fertilizer from chemical fertilizer. The organic matter contributes to the restoration of the humus and to the fertility of the soil. Also, the fertilizer has good nitrogen: phosphorus: potassium ratios compared to other organic fertilizers (2-2.5-2.5, even up to 2.7-3.0-3.0). If desired, the end product can be granulated or pelletized in the granules/pellet making machine (13), where the product is delivered by the belt conveyor (12). Belt conveyor (14) delivers the fertilizer to the packing and packaging line (15).

This process can be easily automated using existing technical resources such as computers, software, data acquisition units, automatic relays/switches, etc. All formulas for calculating the ratio of C:N, and moisture content of the raw materials mix is known. Using these, the proper proportions of the components can be calculated.

The process is simplified because it is a batch process. Only one operator is required to supervise it. All equipment and parts can be found on the market. The crusher (3), mixer (7) and used sea containers for the bio-chamber (9) can be cheaply purchased, for example in China. The production line can easily be adjusted for any production volume by adding more bio-chambers (9), belt conveyors and other units if necessary. If desired any unit can be replaced with a more modern or efficient unit without affecting other parts of the whole line. It is expected that this method would work with any type of poultry manure, and with a mix of poultry manure with pig and cattle manure. The bio-chamber (9) could furthermore be used for other processes or products where even aeration is required.

The production line itself is mobile, flexible, scalable and cost effective. It does not require a lot of maintenance or a big space.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, chemical or mechanical equivalents of the specific embodiments and features that have been described and illustrated herein.

The production line can be variously modified within the scope of the claims.

The invention claimed is:

1. A bio-chamber made of an acid resistant material for producing organic fertilizer from poultry manure, the bio-chamber comprising:
a chamber body defining a receiving chamber and an aeration chamber, the aeration chamber underlying the receiving chamber and being divided therefrom by a flat partition, the partition being divided into a grid pattern of about 10 cm grids defining a plurality of square cells, each cell having a plurality of nodes and having a plurality of holes or slits formed therein, one of said holes or slits being positioned at each node of the grid pattern and one hole or slit being positioned at a centre of each of said cells, each of said holes or slits having a width of between 4 and 5 mm;

a plurality of oxygen probes, at least one of said oxygen probes being positioned in each of a lower region, a middle region, and an upper region of said receiving chamber;

a plurality of temperature probes, at least one of said temperature probes being positioned in each of the lower region, the middle region, and the upper region of said receiving chamber; and at least one high pressure air blower connected to the aeration chamber and operable to blow ambient air therein, and a volumetric flow rate of at least 9.5 cubic meters per minute for each 2.2 m$^3$ and a pressure of at least 4200 Pa for each 2.2 m$^3$ of a mass contained in the receiving chamber, said mass having height about 1.5 m.

2. The bio-chamber according to claim 1, further including:
an exhaust fan connected to the receiving chamber to exhaust the odour and excessive moisture from the bio-chamber.

3. The bio-chamber according to claim 1, further comprising:
a cover for the receiving chamber that is at least partially removable.

4. The bio-chamber as claimed in claim 3 wherein said removable cover is made of a material selected from the group consisting of plastic, metal and tarpaulin.

5. The bio-chamber according to claim 1, wherein the chamber body comprises a sea container or a shipping container.

6. The bio-chamber according to claim 1, wherein the walls and the partition are covered by stainless steel sheets or plastic panels and the partition is a stainless steel sheet.

7. A method of making organic fertilizer from poultry manure mixed with a carbon carrier, the method comprising:
mixing the poultry manure with the carbon carrier;
loading the poultry manure and the carbon carrier into the receiving chamber of the bio-chamber defined in claim 1;
monitoring a temperature of the mixture and an oxygen concentration of the mixture;
evenly and fully aerating all layers of the mixture with the at least one air blower; and
regulating the temperature of the mixture and the oxygen concentration of the mixture by adjusting the operation of the at least one air blower, to provide conditions that permit aerobic bacteria to propagate and biodegrade the mixture.

8. The method according to claim 7, further comprising:
crushing the poultry manure to a particle size of 5 mm to 10 mm before the poultry manure is mixed with the carbon carrier.

9. The method according to claim 7, wherein the carbon carrier is sawdust.

10. The method according to claim 7, wherein a pH value of the mixture is from 6 to 8.

11. The method according to claim 7, wherein a C:N ratio of the mixture is from 23:1 to 26:1.

12. The method according to claim 7, wherein a moisture content of the mixture is from 49% to 54%.

13. The method according to claim 7, wherein the oxygen concentration of the mixture is maintained above 5%.

14. The method according to claim 7, wherein the temperature of the mixture is maintained below 90° C.

15. The method according to claim 7, wherein the temperature of the mixture is permitted to rise to 75° C., and is then maintained at 75° C. to 85° C. until the biodegradation is complete.

16. The method according to claim 7, wherein the oxygen concentration of the mixture is permitted to fall to 6%, and is then maintained at 5% to 13% until the biodegradation is complete.

17. The method according to claim 7, wherein the organic fertilizer has more than 50% organic matter.

18. The method according to claim 7, wherein the organic fertilizer has a nitrogen:phosphorus:potassium ratio from 2-2.5-2.5up to 2.7-3.0-3.0.

19. The method according to claim 7, wherein the organic fertilizer is free of pathogens, salmonella, and weed seeds.

* * * * *